United States Patent

[11] 3,622,707

[72] Inventor John J. Golembeski
New Providence, N.J.
[21] Appl. No. 854,873
[22] Filed Sept. 3, 1969
[45] Patented Nov. 23, 1971
[73] Assignee Bell Telephone Laboratories, Incorporated
Murray Hill, Berkeley Heights, N.J.

[54] MULTIPLE CHANNEL SUBSCRIBER LOOP
3 Claims, 1 Drawing Fig.

[52] U.S. Cl. .......... 179/15 BP, 179/15 AL
[51] Int. Cl. .......... H04j 3/00
[50] Field of Search .......... 179/15 BP, 15 BT, 15 AL, 15 AN

[56] References Cited
UNITED STATES PATENTS
3,496,301 2/1970 Kaenel .......... 179/18 FC X
2,451,347 10/1948 McShan .......... 179/15 BP X

*Primary Examiner*—Kathleen H. Claffy
*Assistant Examiner*—Thomas W. Brown
*Attorneys*—R. J. Guenther and Edwin B. Cave

ABSTRACT: A time division multiplex system for use with subscriber stations utilizes a pilot tone to control switches which connect subscribers to the common line during designated portions of each cycle. The pilot tone taken from the line is changed in frequency before being used to control subscriber connection time to eliminate problems of feedback and crosstalk. Further, each subscriber station set is powered by the subscriber's power during normal operation to further improve crosstalk performance. Service is maintained, however, if any subscriber's power fails by reverting to line power and party line operation for the duration of the power failure. Private line service is automatically returned when subscriber power reappears.

PATENTED NOV 23 1971 3,622,707
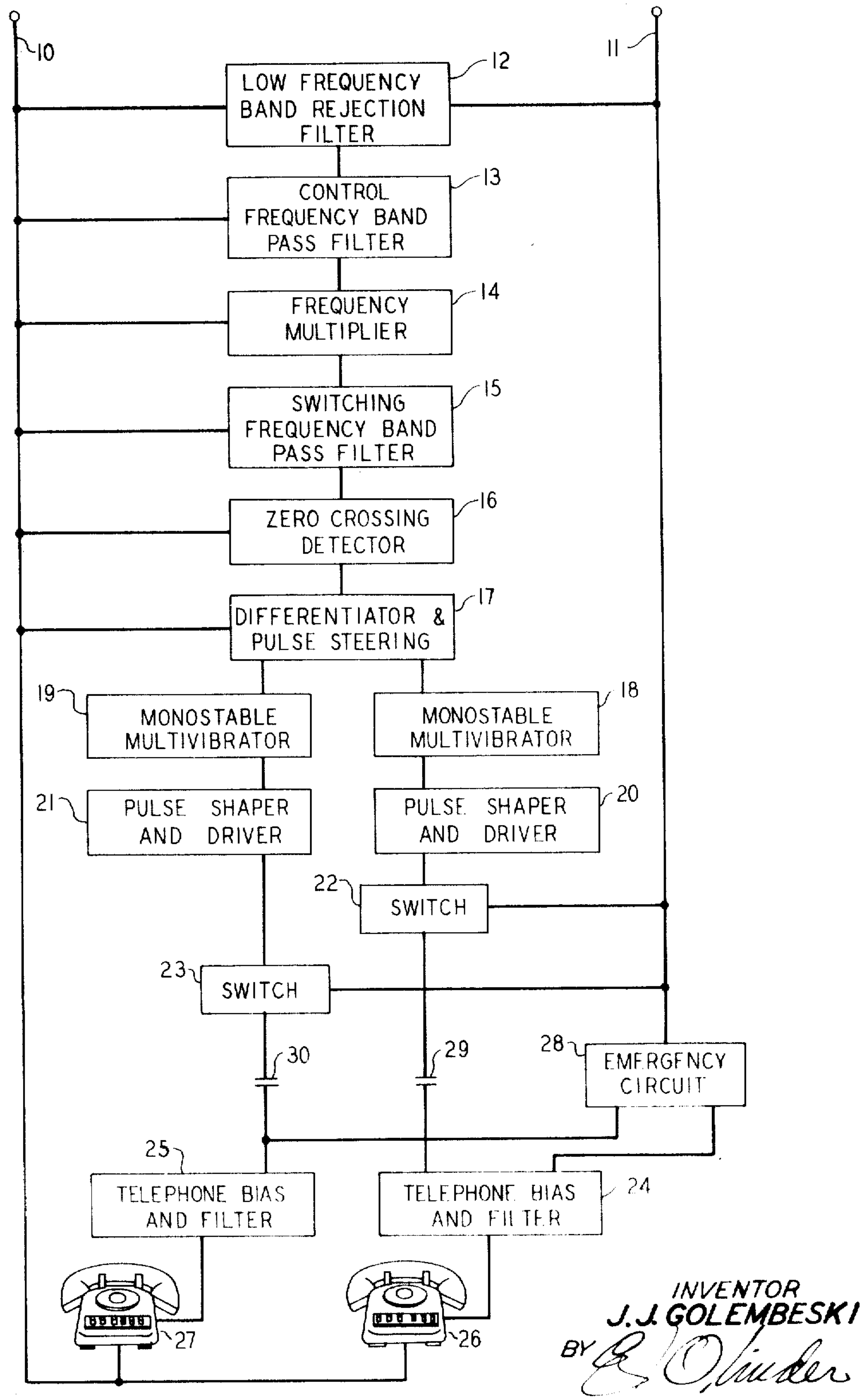
INVENTOR
J. J. GOLEMBESKI
BY [signature]
ATTORNEY

MULTIPLE CHANNEL SUBSCRIBER LOOP

BACKGROUND OF THE INVENTION

This invention relates to systems for transmitting signals on a time division multiplex basis and more specifically to a time division multiplex system of sufficient simplicity and low cost to be used with telephone subscriber stations.

A time division multiplex system includes a common link which is shared by a plurality of pairs of stations communicating via distinct time channels in the common link. Each pair of stations in communication is assigned a time channel or slot in a repetitive cycle of time slots, and the pair of stations may interchange signals or information during each cyclic occurrence of its assigned time slot. Intermediate the cyclic appearances of the assigned time slot of a particular pair of stations, the common link may be utilized by other pairs of stations in communication.

A time division multiplex system can be utilized to provide additional private line communication service to various groups of telephone subscribers. In urban areas it is becoming increasingly difficult and expensive to add additional telephone lines because of space limitations on the number of lines which may be installed and the difficulty of adding lines even when space is available. In rural areas it is also becoming increasingly costly to install relatively long individual lines to subscribers who wish to obtain or add service. Thus, a simple time division multiplex system which is economical enough for use on individual subscriber lines would be a major contribution to improved telephone service. With such a system, a subscriber could obtain an additional private station without requiring the addition of another telephone line to his premises. Also, a new subscriber could obtain private service by sharing a common line with some neighboring station, since neither party would interfere with the other.

Many types of time division multiplex systems have been developed. For example, a system for use with a private branch exchange (PBX) is described in R. C. Gebhardt et al. U.S. Pat. No. 3,225,144, issued Dec. 21, 1965. Also many methods of sequentially connecting or switching the plurality of individual stations to the common link have been developed. Most of the switching methods utilize a central or common control unit to control the switching. Such a common control unit is shown, for example, in H. S. Feder et al. U.S. Pat. No. 3,068,322, issued Dec. 11, 1962. However, because of the cost and requirement of the common equipment, none of the systems which have been developed are economical enough to be used on the basis of individual subscriber lines. That is, if only a small group of subscribers within a specific central office is unable to obtain additional service because of limitations on the telephone plant, the use of one of the presently available time division multiplex systems to furnish such service would not be economical. Thus, a system which would be economical enough for use by a small group of subscribers, such as the occupants of an apartment building, is very desirable.

Accordingly, it is an object of this invention to provide a simple, efficient, reliable time division multiplex system which may be utilized with individual telephone subscriber lines.

Another object is to eliminate the need for a centralized control apparatus in a time division multiplex system.

SUMMARY OF THE INVENTION

The foregoing objects and others are achieved in accordance with the principles of the invention by a time division multiplex system comprised of simple apparatus which is installed on the subscribers' end of the telephone line. A pilot tone or control frequency is placed on the common line. The multiplex apparatus on the subscribers' end of the line filters the pilot tone from the line and changes the frequency thereof to suppress feedback and crosstalk. The derived signal is then processed through a zero crossing detector and a differentiator circuit to obtain a series of timing signals. After shaping and amplification, the timing signals are used to control switches which sequentially connect the multiple subscriber' stations to the common link or line.

The apparatus of the multiplex system is powered from the telephone line. However, the individual subscriber stations are powered by the individual subscriber' power. An emergency circuit is provided to insure that at least limited telephone service will remain if any subscriber experiences a power failure. In such a case, all of the stations sharing a common line are switched from the individual subscriber's power to line power from the central office. The telephone service in such an emergency converts from private service to party service with simultaneous ringing of all stations. Private line service is automatically restored when the subscriber power failure ends.

The time division multiplex system disclosed is especially designed to provide two channels on a single subscriber loop. Further, the system is most applicable to short subscriber loops. However, the principles of the system could be extended to provide more than two channels per loop. Application of the system to long loops requires additional apparatus to eliminate such problems as dispersion of the signal by the line.

BRIEF DESCRIPTION OF THE DRAWINGS

The principles of the invention may be more fully comprehended from the following detailed description and accompanying drawing in which the single FIGURE is a representation in block diagram form of the system of this invention.

DETAILED DESCRIPTION

The basic elements of the disclosed time division multiplex system for subscriber loops are depicted in the drawing. The subscriber loop is comprised of two wires 10 and 11 connected from the central office to some point where the wires 10 and 11 are to branch out to the individual subscriber stations 26 and 27. This branch point may, for example, be on a particular subscriber's premises when an individual subscriber is adding service. The branch point may be where the telephone line enters an apartment building in the case of two different subscribers sharing a common line. The wires 10 and 11 connect through the central office to other subscriber stations with which stations 26 and 27 will communicate. Thus, the wires 10 and 11 are the common link on which the stations 26 and 27 are to be multiplexed. Wire 10 may be considered the ground or return path and wire 11 the signal path.

Wire 11 carries or transmits the information signals between stations 26 and 27 and any other stations which may desire to communicate with either station 26 or 27. For normal telephone conversations, the frequencies of the information signals are usually less than 4 kilohertz. For other types of communication, the frequency band of the signals may be slightly different.

In accordance with the principles of this invention, in addition to the information signals on the common wire 11, a pilot tone or control frequency also is placed thereon to control the time division multiplexing. The pilot tone is used to establish the sampling rate or rate of switching between different subscriber stations. This pilot tone may advantageously be simply a sinusoidal signal at the desired frequency. The frequency of the pilot tone should be as close as possible to the upper frequencies of the information signals on the line in order to reduce the problem of dispersion caused by unequal transmission losses of different frequencies. However, the pilot tone must also be sufficiently high to yield an adequate sampling rate. This sampling rate should normally exceed twice the highest signal frequency. It has been found advantageous to utilize a pilot tone with a frequency of approximately 9 kilohertz. This frequency is low enough to keep dispersion from being a major problem, while simultaneously being high enough to permit an adequate sampling rate for the multiplexing system.

At the branch point of the common wires 10 and 11, the pilot tone is filtered from the wire 11 by an appropriate pilot tone or control frequency band-pass filter 13. Filters which would be appropriate for this use are known in the art. A low frequency band rejection or notch filter 12 is used with the band-pass filter 13 to filter out the low frequency audio signals and enhance crosstalk suppression via improved rejection of out of band frequencies by the band-pass filter 13. The filter 12 could advantageously be a 500-hertz notch filter which is known in the art.

Feedback and thereby crosstalk is introduced when the station sets are switched on and off the line if the pilot tone and switching frequencies are identical. The system of this invention switches the subscriber stations 26 and 27 across the common link at a rate faster than the pilot tone frequency itself to avoid this crosstalk. The feedback is caused by asymmetrical impedance exhibited by the two subscriber stations 26 and 27. If one station is not in use while the other station is communicating, each station exhibits a different impedance loading the common link during its respective portion of the cycle. Thus, a signal waveform with frequency components at the switching frequency appears at the input of the control frequency band-pass filter 13. If the switching frequency is the same as the pilot tone frequency, the new generated signal is fed back through the pilot tone detection and processing circuitry. This can degrade crosstalk performance and cause oscillation. However, if the switching frequency is sufficiently different from the pilot tone frequency, the pilot tone band-pass filter rejects the generated signal and no feedback results. Thus, the system of this invention utilizes a switching frequency which is derived from the pilot tone but which has a frequency different from the pilot tone frequency.

The switching frequency is derived from the pilot tone by the frequency multiplier 14 and switching frequency bandpass filter 15. The frequency multiplier circuit 14 might advantageously be the circuit disclosed in a copending application of J. J. Golembeski, Ser. No. 854,872, filed Sept. 3, 1969 and issued as U.S. Pat. No. 3,566,247 on Feb. 23, 1971. This application discloses a fully integrable, frequency multiplying circuit with low temperature dependence.

After the switching signal at a frequency different from the pilot tone frequency is obtained, it is processed by a bandpass filter 15 centered at the switching frequency to restore the sinusoidal shape. The bandpass filter 15 is known in the art. Thus, if the pilot tone frequency is 9 kHz., the output from the frequency multiplier circuit 14 and filter 15 could be 18 kHz. for example. The switching signal is then processed by a zero crossing detector 16 to obtain a series of timing pulses at the switching frequency. Detection of the zero crossing points is utilized because the zero points are independent of signal amplitude and therefore of loop length. Zero crossing detector circuits are known in the art. The square pulses from the zero crossing detector 16 are differentiated by a differentiator and pulse steering circuit 17. The differentiation is done to obtain a series of alternating positive and negative pulses which occur at the proper instants of time, and which control the switches which connect the subscribers' stations 26 and 27 to the common lines 10 and 11 during mutually exclusive periods. For example, a positive pulse is derived from the leading edge of the pulse from the zero crossing detector 16 to switch station 26 to the common line whereas a negative pulse derived from the trailing edge of the pulse switches station 27 to the common lines 10 and 11. The steering circuitry comprises diodes which direct the positive and negative pulses along different parallel paths which connect with and control the different subscriber stations 26 and 27.

The alternate positive and negative pulses from the differentiator and pulse steering circuit 17 are used to trigger first and second multivibrator circuits 18 and 19, respectively. The multivibrator circuits 18 and 19 determine the actual connection time and therefore the duty cycle for each subscriber station, i.e., the percentage or ratio of the time during any cycle that each station is connected to the common lines 10 and 11. The duty cycle may be adjusted by adjusting a resistor in the multivibrator circuits. Multivibrator circuits suitable for this purpose are known in the art. For two subscriber stations 26 and 27, utilizing the common lines 10 and 11, the duty cycle must be less than 50 percent of one-half, or signal overlaps and therefore crosstalk results. A lower bound for the duty cycle depends upon the transmission loss deemed acceptable, the loop length, and the allowable crosstalk in a given installation. The duty cycle is chosen as low as is acceptable from a transmission viewpoint to insure that the signal from one station has completely disappeared on the common lines 10 and 11 before the signal from the other subscriber station is connected therewith. If the signal has not completely disappeared, crosstalk will be produced between the two stations 26 and 27.

The pulses from the multivibrators 18 and 19 are further processed by pulse shaper and driver circuits 20 and 21, respectively. These squarer and driver circuits 20 and 21 shape the pulses to obtain sharp breaks and rapid rise and decay times for good control of switches 22 and 23, respectively. The shaper and driver circuits 20 and 21 also present very high impedance sources to switches 22 and 23, respectively, to eliminate significant fluctuations in signal levels when the switches 22 and 23 change state. Switches 22 and 23 are simple transistor switches known in the art. These switches 22 and 23 are driven by shaper and driver circuits 20 and 21, respectively, at such a level that each switch 22 or 23 is saturated when it is conducting. Thus, when conducting, the switches 22 and 23 allow passage of signals in both directions. This bilateral operation is required in a normal subscriber communication. When the driving signal is removed, switches 22 and 23 completely isolate the stations 26 and 27, respectively, from common lines 10 and 11 by presenting a very high impedance to these stations.

To further eliminate crosstalk between the subscriber stations 26 and 27, the subscriber stations are powered from the individual subscriber's power. Under such conditions, there is no DC power for the stations on the common line 11, although there is power for the apparatus of the multiplex system itself. Thus, the coupling or crosstalk caused by fluctuations in the line power, because of changes in the loading by the subscriber stations 26 and 27 during their connection times, is eliminated. The power for the stations 26 and 27 is derived through transistor bias and filter circuits 24 and 25, respectively, which are used to approximate current sources for the stations. Suitable bias and filter circuits are known in the integrated circuit art. The DC power derived for the subscriber2' stations from the subscriber' power source is kept from the common lines 10 and 11 by appropriate blocking capacitors 29 and 30.

A major problem caused by the use of subscriber power is the possible complete loss of service if the subscriber experiences a power failure. The problem is alleviated by the utilization of an emergency circuit 28 to connect all subscriber stations directly to the common line 11 in the event of a power failure by one subscriber. Thus, the stations become powered from the central office. All stations are then connected in parallel on a single party line, and each station will ring when any station on the line is dialed. However, each subscriber would have limited service throughout the emergency period. The emergency circuit 28 may comprise a relatively simple relay circuit which operates to connect each subscriber station directly to the common lines 10 and 11 when any customer loses power. The multiplex system switching apparatus is bypassed during the emergency period, and automatically becomes operative again when power is restored.

The time division multiplex system of this invention is particularly adapted to short subscriber loops. The problems of transmission dispersion on long loops might require additional apparatus for phase equalization.

The time division multiplex system of this invention has been discussed in terms of two stations per common line. However, the system could be modified to accommodate more than two stations. Therefore, it is to be understood that the embodiment of the invention disclosed herein is merely illustrative of the principles of the invention. Various modifications thereto might be made by those skilled in the art without departing from the spirit and scope of the invention.

What is claimed is:

1. A time division multiplex system comprising, in combination:

first and second telephone stations utilizing a common telephone line;

first and second switches for connecting said first and second stations, respectively, to said line;

means for receiving a control signal from said line, said control signal having a frequency outside the frequency band utilized for transmitting voice signals on said line; and means for utilizing said control signal to control said first and second switches for connecting said first and second stations, respectively, across said line in first and second time intervals, respectively, of a repetitive cycle, said utilizing means including a frequency multiplier circuit for changing the frequency of said control signal to form a second signal so that said first and second switches operate at a frequency different than said frequency of said control signal thereby to reduce feedback and crosstalk caused by the operation of said first and second switches.

2. Apparatus in accordance with claim 1 wherein said utilizing means further includes a threshold crossing detector circuit and a differentiator circuit for converting said second signal into first and second pulse trains having pulses in said first and second time intervals, respectively; and first and second circuit means for imparting a desired configuration to said pulses in said first and second pulse, respectively, and applying said pulse trains to operate said first and second switches, respectively.

3. Apparatus in accordance with claim 1 wherein said first and second telephone stations are energized from a source of power isolated from said line, and including an emergency circuit for connecting said first and second stations directly to said line when said source of power malfunctions so that said stations remain operable.

* * * * *